US011095745B1

(12) United States Patent
Yadav et al.

(10) Patent No.: US 11,095,745 B1
(45) Date of Patent: Aug. 17, 2021

(54) CLOUD-BASED SCHEDULING OF DATA OPERATIONS TO AN OBJECT STORAGE USING AN OPERATION POOL

(71) Applicant: EMC IP Holding Company LLC, Hopkinton, MA (US)

(72) Inventors: Sunil Yadav, Bangalore (IN); Shelesh Chopra, Bangalore (IN); Amarendra Behera, Bangalore (IN); Ravi Vijayakumar Chitloor, Bengaluru (IN); Tushar Dethe, Bangalore (IN); Jigar Bhanushali, Bengaluru (IN); PrabhatKumar Dubey, Huskuru (IN); Deependra Singh, Kanpur (IN); Himanshu Arora, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/079,034

(22) Filed: Oct. 23, 2020

(51) Int. Cl.
*G06F 3/06* (2006.01)
*H04L 29/08* (2006.01)
*H04L 29/06* (2006.01)

(52) U.S. Cl.
CPC ........ *H04L 67/2871* (2013.01); *H04L 67/325* (2013.01); *H04L 67/42* (2013.01)

(58) Field of Classification Search
None
See application file for complete search history.

(56) References Cited

U.S. PATENT DOCUMENTS

| 7,337,226 | B2 * | 2/2008 | Saha ................ G06F 16/24539 709/226 |
| 2017/0083314 | A1 * | 3/2017 | Burger ................ G06F 9/30101 |
| 2018/0225124 | A1 * | 8/2018 | Gupta ................ G06F 9/30076 |
| 2020/0410094 | A1 * | 12/2020 | Liu ........................ G06F 21/556 |

FOREIGN PATENT DOCUMENTS

WO    WO2021017304  A1 *  2/2021

* cited by examiner

*Primary Examiner* — Natisha D Cox
(74) *Attorney, Agent, or Firm* — Dergosits & Noah LLP; Todd A. Noah (57) ABSTRACT

Described is a system for cloud-based scheduling of data operations to an object storage. The system may include a server that acts as an intermediary between a client device and an object storage that stores client data. Requests by the client device to manage data on the object storage may be routed through the server. In response, the server may execute corresponding data operations directly on the object storage. The server may manage bandwidth limits for operation requests to an object storage by maintaining a specialized operation pool. The operation pool may be configured to manage operation-specific queues, and these operation-specific queues may include sub-operations (or threads) that are executed on the object storage. Sub-operations of various types of operations may be initiated for concurrent execution on the object storage based on scheduling information derived from the operation pool.

20 Claims, 4 Drawing Sheets

CLOUD-BASED SCHEDULING OF DATA OPERATIONS TO AN OBJECT STORAGE USING AN OPERATION POOL

TECHNICAL FIELD

This disclosure relates to managing data backup systems, and more particularly, managing operation requests to a storage system by scheduling operations based on an operation pool.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on such cloud-based storages to leverage the benefits associated with such on-demand systems such as cost efficiency and scalability. To interact with these cloud-based storages, clients may access a storage interface such as an application programming interface (API) provided by the cloud-based storage system. For example, these APIs may provide the ability for a client to access a cloud-based storage and perform various data operations. Accordingly, these APIs may handle requests from multiple clients (or subscribers) simultaneously. However, a cloud-based storage system may only be able to handle a certain amount of requests, for example, per second. When the number of requests exceeds such a limit, the cloud-based storage system may issue an error. For example, these errors are often in the form of a throttling error that will reject/fail all subsequent requests. Clients initiating such requests typically manage such errors using retry logic. In other words, clients will often continue initiating these requests until the throttling error is resolved. Not surprisingly, relying on such rudimentary retry logic often results in an inefficient allocation of resources for both the client and the cloud-based system. Thus, there is a continued need to efficiently manage access requests to cloud-based storage systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for cloud-based scheduling of data operations to an object storage. The system may include a server that acts as an intermediary between a client device and an object storage that stores client data (e.g. backup data). Requests by a client device to manage data stored on the object storage may be routed through the server. In response, the server may execute corresponding data operations directly on the object storage. The server may efficiently manage bandwidth limits for operation requests to an object storage by maintaining a specialized operation pool. For example, instead of applying simple retry logic, the server may leverage the operation pool to improve data operation performance. The operation pool may be configured to manage operation-specific queues, and these operation-specific queues may include sub-operations (or threads) that are executed on the object storage. Accordingly, sub-operations of various types of operations may be initiated for concurrent execution on the object storage based on scheduling information derived from the operation pool.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

Figure 1:
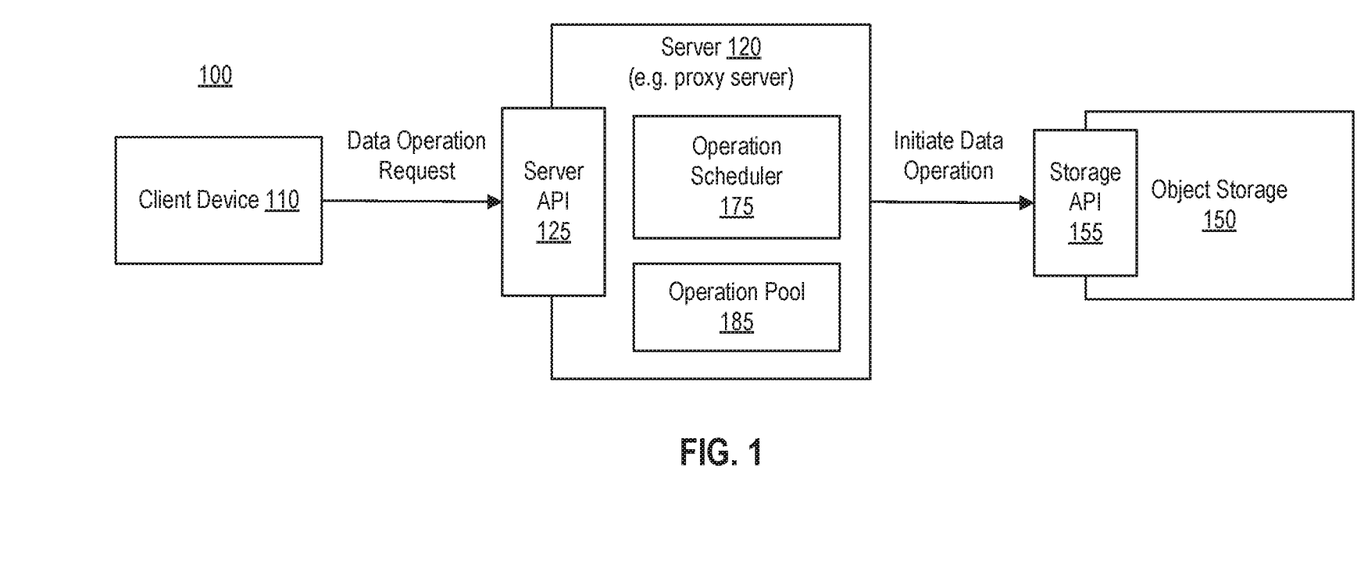
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing data operations to an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage (or platform) provided by a different (or second) entity. For example, the server 120 may be provided as part of the backup service provided the first entity (e.g. Dell EMC), and the object storage 150 may be provided as part of an object storage service provided by the different entity (e.g. service such as Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with data (e.g. one or more files, directories, objects, etc.) that is backed up to an object storage 150. The object storage (or object storage system) 150 may include a persistent object storage that implements a storage architecture that manages data as objects. For example, each object stored by an object storage 150 may include data, meta-data, and/or a globally unique identifier for the object. The client device 110 may use the server 120 as an intermediary for managing client backup data stored on the object storage 150. For example, the server 120 may provide enhanced security by being a single secure point of access to data stored externally on an object storage 150. For example, a client device 110 may implement certain a network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive processing. For example, the server 120 may handle scheduling of data operations to improve performance of backup-related processing. Accordingly, the server 120 may provide advantages over traditional proxy servers that merely forward data to the object storage 150. The server 120 may be an application or hardware component remote from the client device 110, and may be provided as part of a cloud-based backup service platform. Accordingly, the server 120 may be scalable such that it may perform data operation scheduling in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed and scheduled by the server 120. For example, as shown, the client device 110 may provide (or send, transmit, etc.) a data operation request to the server 120 using a server API 125. The server 120 may then initiate (or perform, execute, etc.) a corresponding data operation directly on the object storage using the storage API 155. In some embodiments, the server API 125 may be a REST API that includes a common set of operations that correspond to various data-related operations on the object storage 150. For example, the server API 125 may include operations allowing a client device 110 to read data from an object storage 150, write data to an object storage 150, delete data from an object storage 150, copy data within the object storage 150, and various other operations for managing data. The same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 155. Accordingly, despite the potentially different types of client devices 110 and object storages 150, all of the data may be managed through the same server 120. For example, client devices 110 associated with different customers of an object storage 150 (or object storage service) may use the same proxy server API 125. Accordingly, the configuration of the server 120 may allow customers (or clients) of a backup service to efficiently and seamlessly interact with the different cloud-based services providers (or entities) when managing backup data.

As described, the server 120 may schedule data operations to be performed on the object storage 150. Accordingly, the server 120 may include an operation scheduler 175. The operation scheduler (or manager) 175 may coordinate (or manage, orchestrate, execute, automate, etc.) the scheduling (or initiation, execution, etc.) of data operations on the object storage 150. In some embodiments, the operation scheduler 175 may provide a user interface that allows a user to perform and configure various scheduling settings. For example, the user interface may allow a user to input various settings such a limit for a number of concurrent requests (or accesses) to an object storage 150. In addition, the operation scheduler 175 may direct (or control, initiate, etc.) other components of the operating environment 100 to perform various processes as further described herein. To perform such scheduling, the server 120 may manage (or maintain) an operation pool (or queue, list, set, etc.) 185. The operation pool 185 may store one or more queues for performing operations on the object storage 150 as further described herein. For example, the scheduler 175 may access the operation pool 185 to determine which operations, and more specifically, which operation threads (or sub-operations) should be executed on the object storage 150. Accordingly, the server 120 may efficiently manage data operations for an object storage by leveraging a specialized operation pool 185. A configuration of such an operation pool 185 according to some embodiments is further described with reference to FIG. 2.

Figure 2:
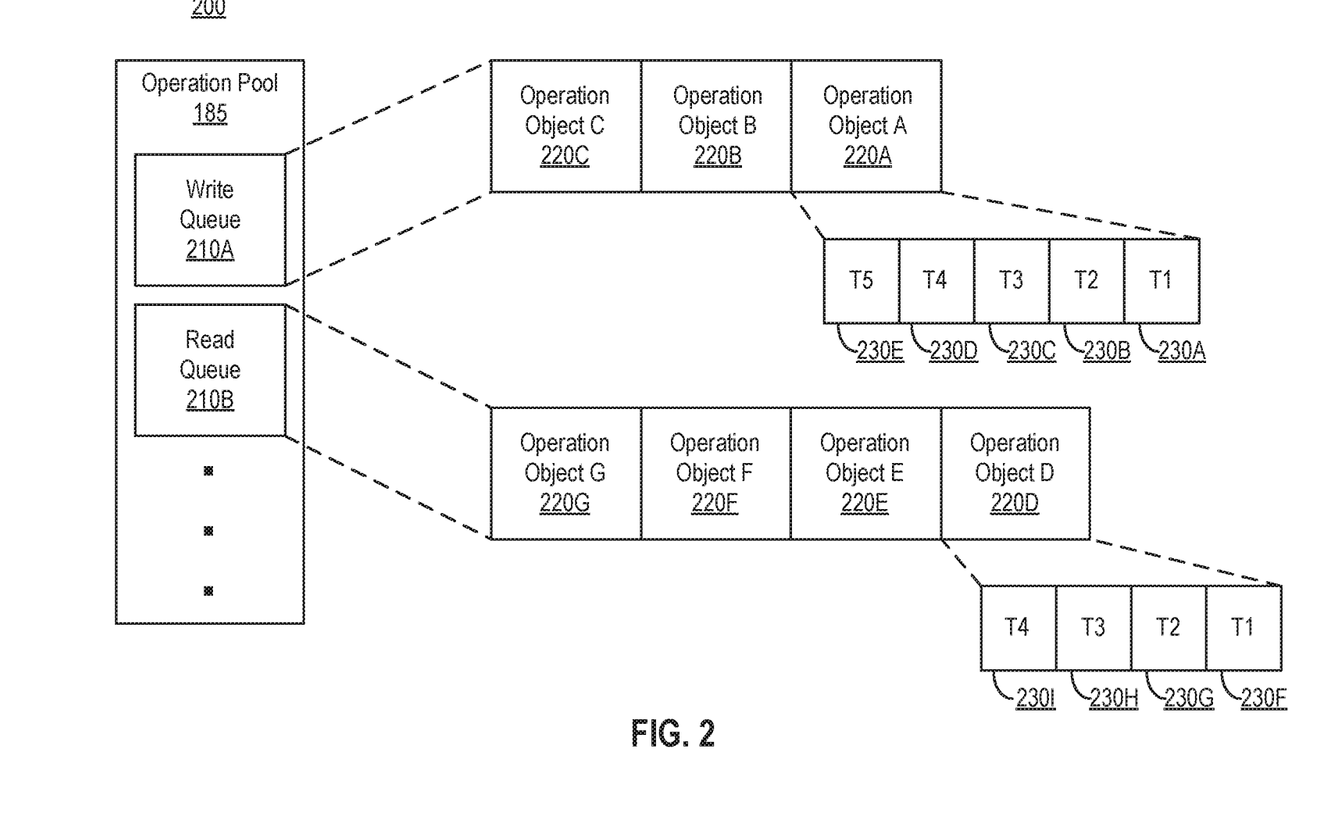
FIG. 2 is a block diagram illustrating an example configuration of an operation pool according to one or more embodiments of the disclosure.

FIG. 2 is a block diagram 200 illustrating an example configuration for an operation pool according to one or more embodiments of the disclosure.

As shown, to provide efficient management of access requests to an object storage (e.g. object storage 150), a server (e.g. server 120) may manage (or maintain) an operation pool 185 to schedule (or distribute) such access requests to the object storage. For example, these access requests may be data operations that are initiated via API calls to object storage (e.g. via calls to storage API 155). In some embodiments, the operation pool 185 may be configured to allow the server to perform data operations (or operations) on the object storage in a thread-safe manner. Accordingly, the operation pool 185 may ensure thread-safety while providing an efficient allocation of resources. For example, data operations may be managed such that operations are accurately fulfilled (e.g. according to their design specifications) and without unintended interaction.

As shown, the operation pool 185 may store an operation queue 210 for each type of data operation that may be performed on the object storage. In other words, in some embodiments, an operation queue 210 may be an operation-specific (or operation-type-specific) queue. For example, these data operations may include read, write, delete, bulk delete, copy (e.g. storage-side copy), and other types of data operations that may be used to access, manipulate, or manage data stored on the object storage. In some embodiments, the type of data operations may include (or correspond to) the available types of access requests to the object storage. For example, the types of data operations may correspond to the available types of methods (or calls, functions, operations, etc.) provided by a storage API. As shown in this example, the data operations provided by the object storage may include at least a write operation and a read operation. Accordingly, as shown, the access request pool 185 may include a write operation queue 210A representing write operations to be performed on the object storage, and a read operation queue 210B representing read operations to be performed on the object storage.

As shown, each operation queue 210 may store a set of operation objects (or elements, identifiers, etc.) 220. Each operation object 220 may represent (or identify, reference, etc.) an operation to be performed on the object storage. For example, a server may receive a request to perform a data operation on the object storage from a client device (e.g. client device 110), the server may then store a representation of the requested data operation as an operation object 220. As shown in this example, write queue 210A may store three operation objects (e.g. operation objects 220A-C) that represent three different write requests, and read queue 210B may store four operation objects (e.g. operation objects 220D-G) that represent four different read requests. It should be noted that the operation queue (or operation-based queue) 210 may be configured in any suitable manner using one or more suitable types of data structures (e.g. an array of objects), and although an object is used to represent operations (e.g. operation objects 220), any suitable type of data structure may be used.

To improve operation performance, requested data operations such as large read and write operation may be divided (or partitioned, separated, etc.) into smaller operations. These smaller operations may be performed as part of a process, and accordingly, may be divided into sub-operations (or threads) 230. Accordingly, each operation object 220 may identify (or reference, represent, etc.) a set sub-operations 230 to be performed that complete a corresponding data operation (or parent data operation). As shown in this example, operation object 220A represents a write operation to be performed on the object storage, and operation object 220D represents a read operation to be performed on the object storage. Accordingly, the write operation represented by operation object 220A may include five sub-operations (e.g. threads 1-5) 230A-E, and the read operation represented by operation object 220D may include four sub-operations (e.g. threads 1-4) 230F-I.

To further improve operation performance, one or more sub-operations 230 may be initiated (or executing, run, etc.) concurrently (or simultaneously, at the same time, etc.). An object storage may have a limit on the number of operation (or access) requests it may be able to handle at any given point in time. As a result, the operation pool 185 may be referenced to determine an ordering (e.g. schedule) for the sub-operations 230. For example, if the server divides a write operation into 5 sub-operations (e.g. sub-operations 230A-E), and the object storage can currently handle an additional 4 concurrent operation requests, the server may initiate only 4 of the sub-operations (e.g. sub-operations 230A-D) to be performed concurrently. As a result, the remaining sub-operations (e.g. sub-operation 230E) may be initiated upon availability of an operation request to the object storage. In addition, the various types of sub-operations may execute concurrently. For example, the four write sub-operations 230A-D may execute concurrently with the four read operations 230F-I. Accordingly, upon freeing of an operation request from a completion of any of sub-operations 230A-D or 230F-I, the server may initiate the execution of sub-operation 230E.

In some embodiments, the limit of concurrent operation requests the object storage imposed may be for all operation types. For example, the limit may be determined based on the sum of all the currently executing write, read, delete, etc. operations. In some embodiments, the limit of concurrent operation requests the object storage imposed may be for a particular type of operation (e.g. an operation-specific/operation-type-specific limit). For example, the limit for concurrent write requests may be determined based on the current number of executing write operations. Similarly, the limit for concurrent read requests may be determined based on the current number of executing read operations. Accordingly, the execution performance of various data operation requests may be improved by scheduling corresponding sub-operations 230 according to the specialized operation pool 185. An example method of scheduling data operations using the operation pool 185 is further described with reference to FIG. 3.

Figure 3:
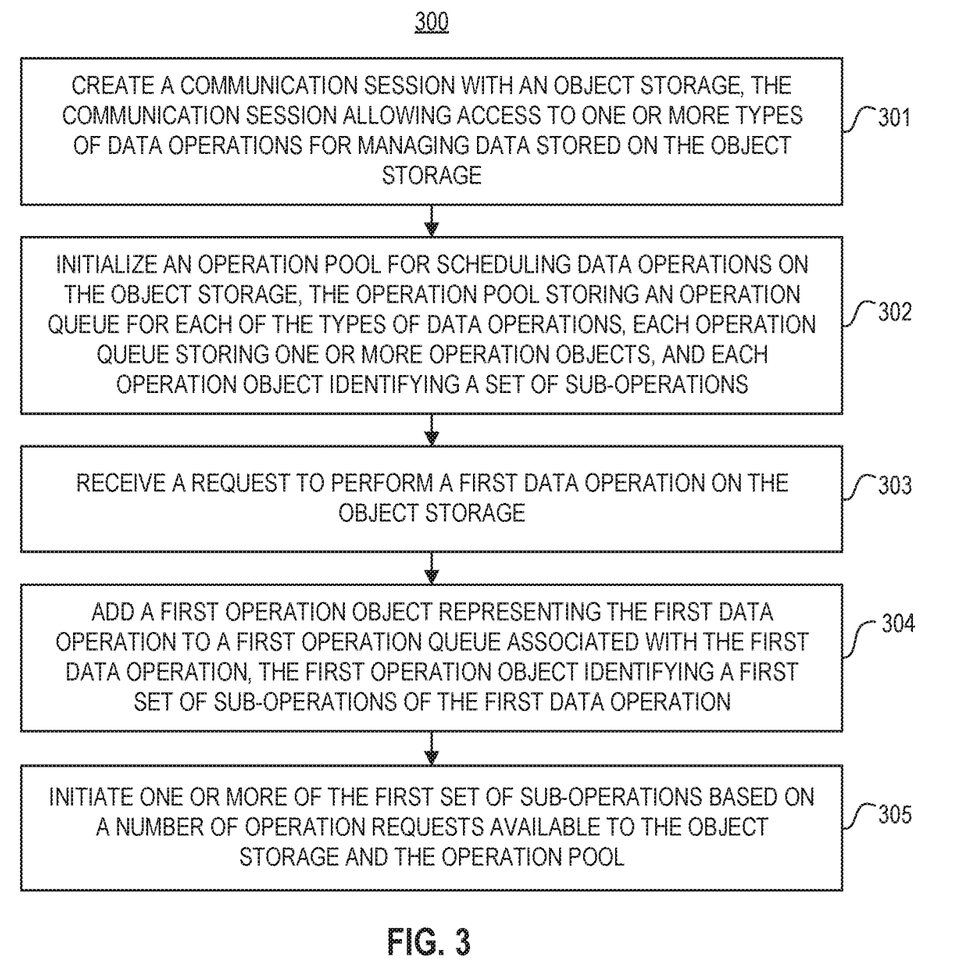
FIG. 3 is a flow diagram illustrating an example method of scheduling data operations on an object storage according to one or more embodiments of the disclosure.

FIG. 3 is a flow diagram illustrating an example method for scheduling data operations to an object storage according to one or more embodiments of the disclosure. Process 300 may use processing logic, which may include software, hardware, or a combination thereof. For example, process 300 may be performed by a system including one or more components described in operating environment 100 (e.g. server 120).

In 301, the system may create a communication session with the object storage (e.g. object storage 150). In some embodiments, a server (e.g. server 120) that manages communication between a client device (e.g. client device 110) and an object storage may create the communication session with the object storage. The communication session may allow access to one or more types of data operations for managing data stored on the object storage. For example, the types of data operations may include a write operation, read operation, delete or bulk delete operation, copy or storage-side copy operation, and various other types of operations to manage data. In some embodiments, the server may access the various types of data operations via a storage API (e.g. storage API 155) provided by the object storage. For example, performing a write operation on the object storage may include the server calling (or accessing) a corresponding write method (or function, operation, etc.) provided by the storage API.

The data stored on the object storage may be associated with the client device. For example, the data may include client data backed up to the object storage. In some embodiments, creating a communication session may include the object storage authenticating the server and/or client device. In some embodiments, the communication session may be created after receiving the first data request.

In 302, the system may initialize an operation pool (e.g. operation pool 185) for scheduling data operations on the object storage. The operation pool may store an operation queue (e.g. operation queue 210) for each of the types of data operations. For example, if the operation types include a write and read operation, the operation queues will include a write operation queue (e.g. write queue 210A or first operation queue), and a read operation queue (e.g. read queue 210B or second operation queue). As described, each operation queue may store one or more operation objects (e.g. operation objects 220) that each represent an operation to be performed on the object storage. In addition, each operation object may identify (or reference) a set of sub-operations (e.g. sub-operations 230) of a corresponding operation to be performed on the object storage. For example, for an operation object representing a write operation, the operation object would identify a set of write sub-operations for performing the corresponding write operation (e.g. parent write operation).

In 303, the system may receive, from the client device, a request to perform a first data operation on the object storage. In some embodiments, the server may receive the request. For example, the first data operation may include a write operation to write a 500mb file (or object) to the object storage. In some embodiments, the system may divide the first data operation into a first set of sub-operations. The system may divide the first data operation into a first set of sub-operations based on a resource requirement associated with the first operation. The resource requirement may include an amount of data associated with the data operation. For example, if the amount of data to write (or read, delete, etc.) is above a predetermined threshold, the system may divide the operations into sub-operations associated with an amount of data that is specialized (or preferred, near-optimized, etc.) for storage into the object storage. For example, the write operation of a 500mb file may be divided into 5 sub-operations (or threads), and each sub-operation may be a 100mb write operation. The resource requirement may also be based on a transfer time or other metric associated with performing a data operation.

In some embodiments, the system may identify the appropriate operation queue for a data operation. For example, the system may determine the first data operation (e.g. write 500mb to the object storage) is a first type of data operation (e.g. write operation), and identify a first operation queue (e.g. write queue) as being associated with the first type of data operation. In other words, the system may identify the write operation queue as the appropriate operation-type-specific operation queue.

In 304, the system may add a first operation object (e.g. operation object 220A) representing the first data operation to the first operation queue (e.g. operation queue 210A). The first operation object may identify the first set of sub-operations (e.g. sub-operations 230A-E). For example, the first operation object may represent the requested 500mb write operation, and the system first operation object may identify the five 100mb write sub-operations (or threads).

In some embodiments, the system may determine a number of operation requests available to the object storage. For example, the number of operation requests available may be based on a current operation (or access) request bandwidth availability of the object storage. For instance, the object storage may have a limit on the number of operations requests it can handle at a given point in time (or concurrently). Accordingly, in some embodiments, the number of operation requests available to the object storage may include a current number of concurrent operation requests available to the object storage. In some embodiments, the number of operation requests available to the object storage may include a current number of concurrent first data operation requests available to the object storage. For example, if the first data operation is a write operation, the number of operation requests available may include the current number of concurrent write operation requests available to the object storage.

In 305, the system may initiate one or more of the first set of sub-operations based on the number of operation requests available to the object storage and the operation pool. In some embodiments, the server may initiate one or more of the first set of sub-operations. In some embodiments, one or more of the first set of sub-operations may be initiated concurrently. For example, the original 500mb write operation request may be expedited by performing at least some of the 100mb write sub-operations concurrently. The initiation may also be based on the operation pool. For example, the system may determine which sub-operations to initiate next based on the queue (or ordering) stored by the operation pool.

In some embodiments, initiating one or more of the first set of sub-operations may include accessing (or calling) a first method (e.g. write method) from an API (e.g. storage API 155) provided by the object storage. For example, the first method (e.g. write, store, put, etc.) may correspond to the type of first data operation (e.g. write operation).

As described, the system may schedule various data operations. For example, the system may receive, after the request to perform first data operation and from the client device, a request to perform a second data operation (e.g. read operation) on the object storage. The system may add a second operation object (e.g. operation object 220D) representing the second data operation to a second operation queue (e.g. read queue 210B) associated with the second data operation. The second operation object may identify a second set of sub-operations (e.g. sub-operations 230F-I) of the second data operation. Accordingly, the system (e.g. server) may initiate one or more of the second set of sub-operations based on a number of operation requests available to the object storage after initiating the first set of sub-operations. As described, one of the first data operation and second data operation may be a write operation, and one of the first data operation and second data operation (e.g. other data operation) may be a read operation.

Accordingly, the method may improve operation performance by leveraging the operation pool to schedule sub-operations.

Figure 4:
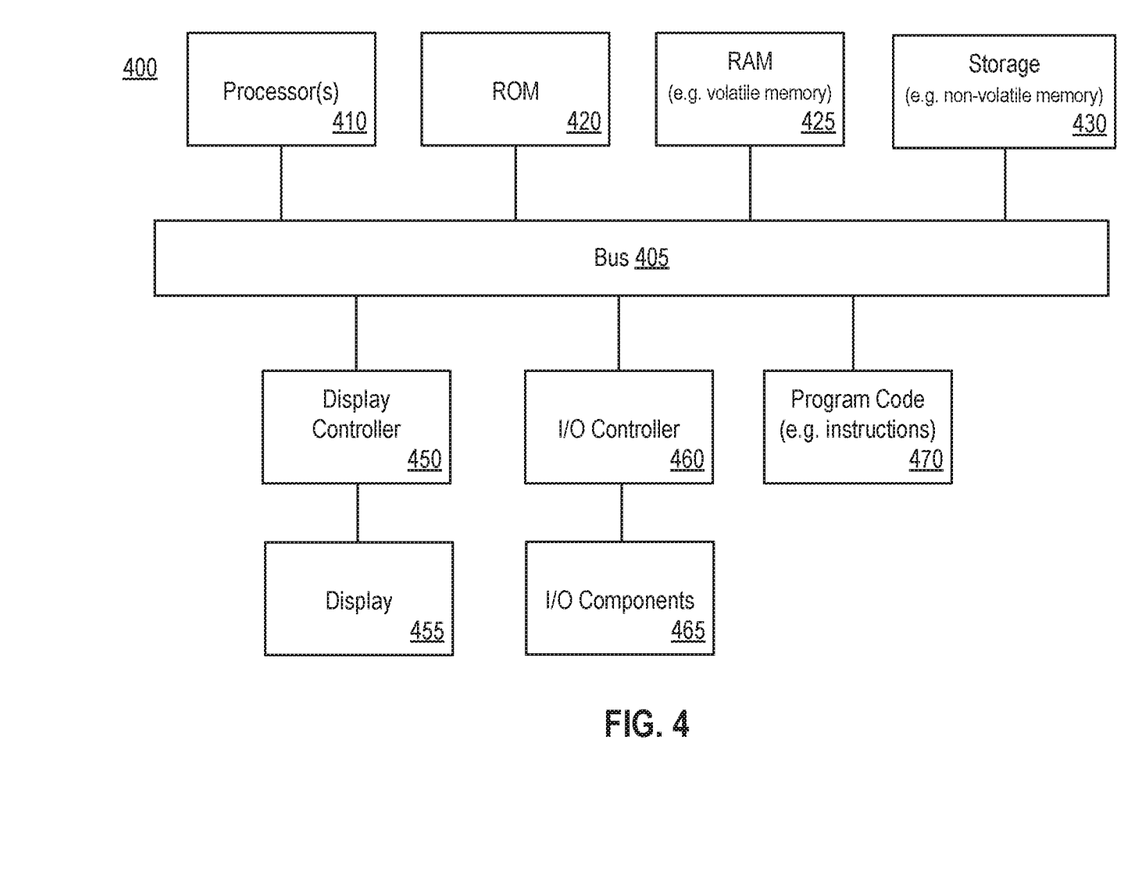
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. server 120, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. server 120, operation scheduler 175, APIs 125/155, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the embodiments disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   create, by a server that manages communication between a client device and an object storage, a communication session with the object storage, the communication session allowing access to one or more types of data operations for managing data stored on the object storage;
   initialize an operation pool for scheduling data operations on the object storage, the operation pool storing an operation queue for each of the types of data operations, each operation queue storing one or more operation objects that each represent an operation to be performed on the object storage, and each operation object identifying a set of sub-operations of a corresponding operation to be performed on the object storage;
   receive, at the server and from the client device, a request to perform a first data operation on the object storage;
   add a first operation object representing the first data operation to a first operation queue associated with the first data operation, the first operation object identifying a first set of sub-operations of the first data operation; and
   initiate, by the server, one or more of the first set of sub-operations based on a number of operation requests available to the object storage and the operation pool.

2. The system of claim 1, wherein the number of operation requests available to the object storage includes a current number of concurrent operation requests available to the object storage, and the one or more of the first set of sub-operations are initiated concurrently.

3. The system of claim 1, wherein the plurality of instructions, when executed, further cause the one or more processors to:
   divide the first data operation into the first set of sub-operations based on a resource requirement associated with the first operation.

4. The system of claim 1, wherein the plurality of instructions, when executed, further cause the one or more processors to:
   determine the first data operation is a first type of data operation; and
   identify the first operation queue as being associated with the first type of data operation.

5. The system of claim 1, wherein initiating one or more of the first set of sub-operations includes accessing a first method from an application programming interface (API) provided by the object storage, the first method corresponding to the first data operation.

6. The system of claim 1, wherein the plurality of instructions, when executed, further cause the one or more processors to:
   receive, after the request to perform the first data operation and from the client device, a request to perform a second data operation on the object storage;
   add a second operation object representing the second data operation to a second operation queue associated with the second data operation, the second operation object identifying a second set of sub-operations of the second data operation; and
   initiate, by the server, one or more of the second set of sub-operations based on a number of operation requests available to the object storage after initiating the first set of sub-operations.

7. The system of claim 6, wherein one of the first data operation and second data operation is a write operation, and one of the first data operation and second data operation is a read operation.

8. The system of claim 1, wherein the number of operation requests available to the object storage includes a current number of concurrent first data operation requests available to the object storage.

9. A method comprising:
   creating, by a server that manages communication between a client device and an object storage, a communication session with the object storage, the communication session allowing access to one or more types of data operations for managing data stored on the object storage;
   initializing an operation pool for scheduling data operations on the object storage, the operation pool storing an operation queue for each of the types of data operations, each operation queue storing one or more operation objects that each represent an operation to be performed on the object storage, and each operation object identifying a set of sub-operations of a corresponding operation to be performed on the object storage;
   receiving, at the server and from the client device, a request to perform a first data operation on the object storage;
   adding a first operation object representing the first data operation to a first operation queue associated with the first data operation, the first operation object identifying a first set of sub-operations of the first data operation; and
   initiating, by the server, one or more of the first set of sub-operations based on a number of operation requests available to the object storage and the operation pool.

10. The method of claim 9, wherein the number of operation requests available to the object storage includes a current number of concurrent operation requests available to the object storage, and the one or more of the first set of sub-operations are initiated concurrently.

11. The method of claim 9, further comprising:
    dividing the first operation into the first set of sub-operations based on a resource requirement associated with the first operation.

12. The method of claim 9, further comprising:
    determining the first data operation is a first type of data operation; and
    identifying the first operation queue as being associated with the first type of data operation.

13. The method of claim 9, wherein initiating one or more of the first set of sub-operations includes accessing a first method from an application programming interface (API)

provided by the object storage, the first method corresponding to the first data operation.

14. The method of claim 9, further comprising:
receiving, after the request to perform the first data operation and from the client device, a request to perform a second data operation on the object storage;
adding a second operation object representing the second data operation to a second operation queue associated with the second data operation, the second operation object identifying a second set of sub-operations of the second data operation; and
initiating, by the server, one or more of the second set of sub-operations based on a number of operation requests available to the object storage after initiating the first set of sub-operations.

15. A computer program product comprising a non-transitory computer-readable medium having a computer-readable program code embodied therein to be executed by one or more processors, the program code including instructions to:
create, by a server that manages communication between a client device and an object storage, a communication session with the object storage, the communication session allowing access to one or more types of data operations for managing data stored on the object storage;
initialize an operation pool for scheduling data operations on the object storage, the operation pool storing an operation queue for each of the types of data operations, each operation queue storing one or more operation objects that each represent an operation to be performed on the object storage, and each operation object identifying a set of sub-operations of a corresponding operation to be performed on the object storage;
receive, at the server and from the client device, a request to perform a first data operation on the object storage;
add a first operation object representing the first data operation to a first operation queue associated with the first data operation, the first operation object identifying a first set of sub-operations of the first data operation; and
initiate, by the server, one or more of the first set of sub-operations based on a number of operation requests available to the object storage and the operation pool.

16. The computer program product of claim 15, wherein the number of operation requests available to the object storage includes a current number of concurrent operation requests available to the object storage, and the one or more of the first set of sub-operations are initiated concurrently.

17. The computer program product of claim 15, wherein the program code includes further instructions to:
divide the first operation into the first set of sub-operations based on a resource requirement associated with the first operation.

18. The computer program product of claim 15, wherein the program code includes further instructions to:
determine the first data operation is a first type of data operation; and
identify the first operation queue as being associated with the first type of data operation.

19. The computer program product of claim 15, wherein initiating one or more of the first set of sub-operations includes accessing a first method from an application programming interface (API) provided by the object storage, the first method corresponding to the first data operation.

20. The computer program product of claim 15, wherein the program code includes further instructions to:
receive, after the request to perform the first data operation and from the client device, a request to perform a second data operation on the object storage;
add a second operation object representing the second data operation to a second operation queue associated with the second data operation, the second operation object identifying a second set of sub-operations of the second data operation; and
initiate, by the server, one or more of the second set of sub-operations based on a number of operation requests available to the object storage after initiating the first set of sub-operations.

* * * * *